Aug. 11, 1942. J. E. McINTOSH ET AL 2,292,646
MOTOR VEHICLE
Filed May 6, 1939 4 Sheets-Sheet 1
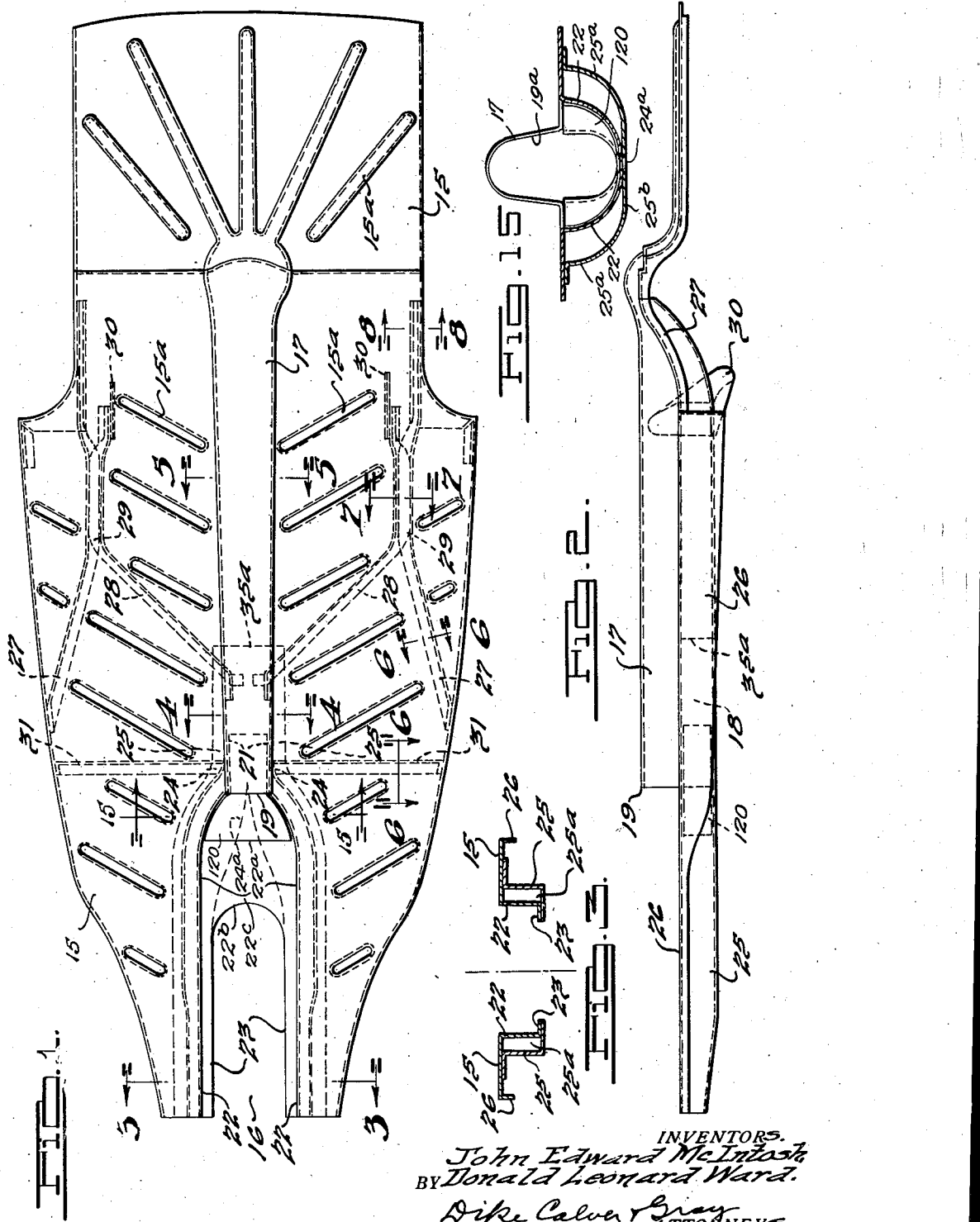
INVENTORS.
John Edward McIntosh
BY Donald Leonard Ward.
Dike, Calver Gray
ATTORNEYS.

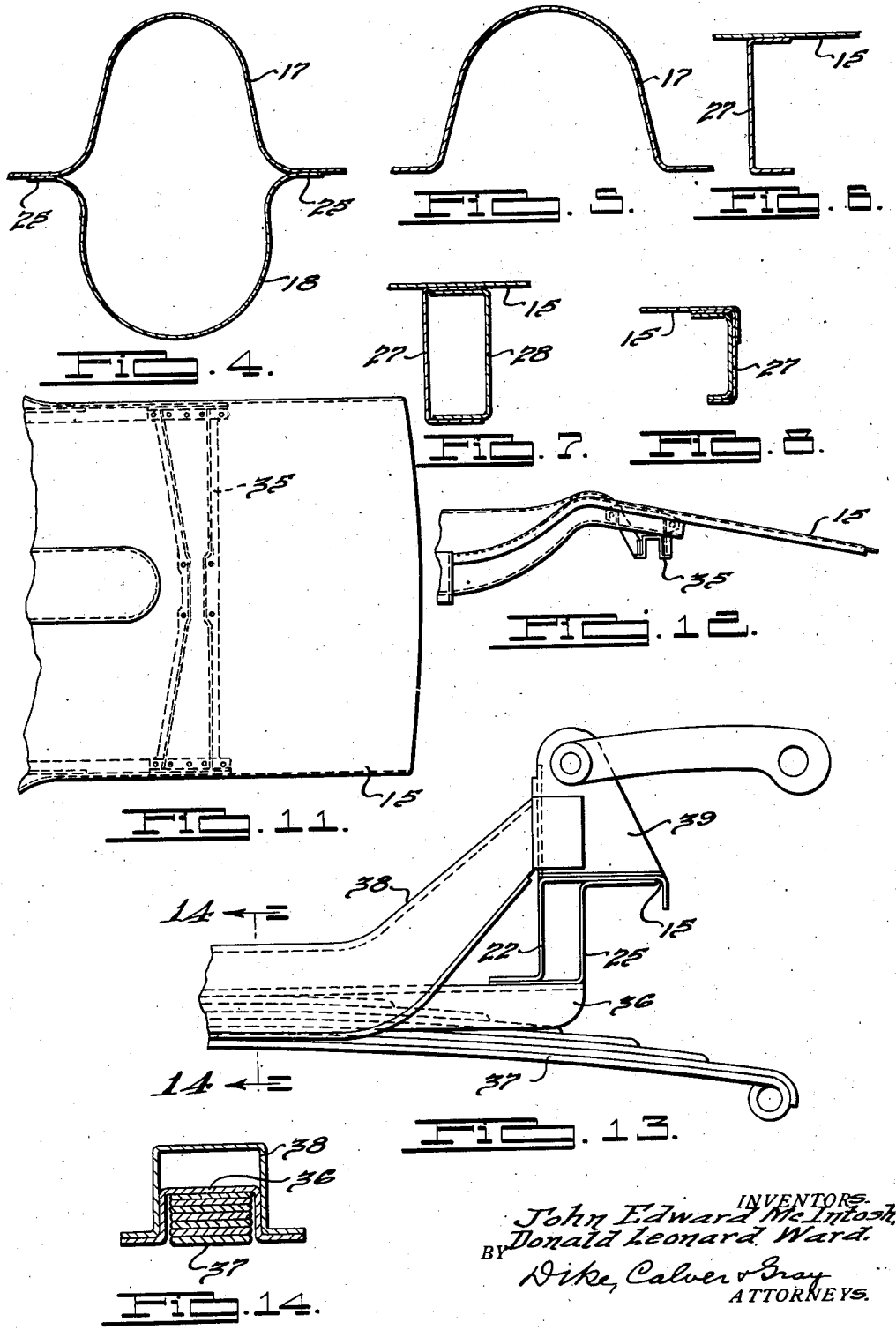

Aug. 11, 1942.  J. E. McINTOSH ET AL  2,292,646
MOTOR VEHICLE
Filed May 6, 1939  4 Sheets-Sheet 3
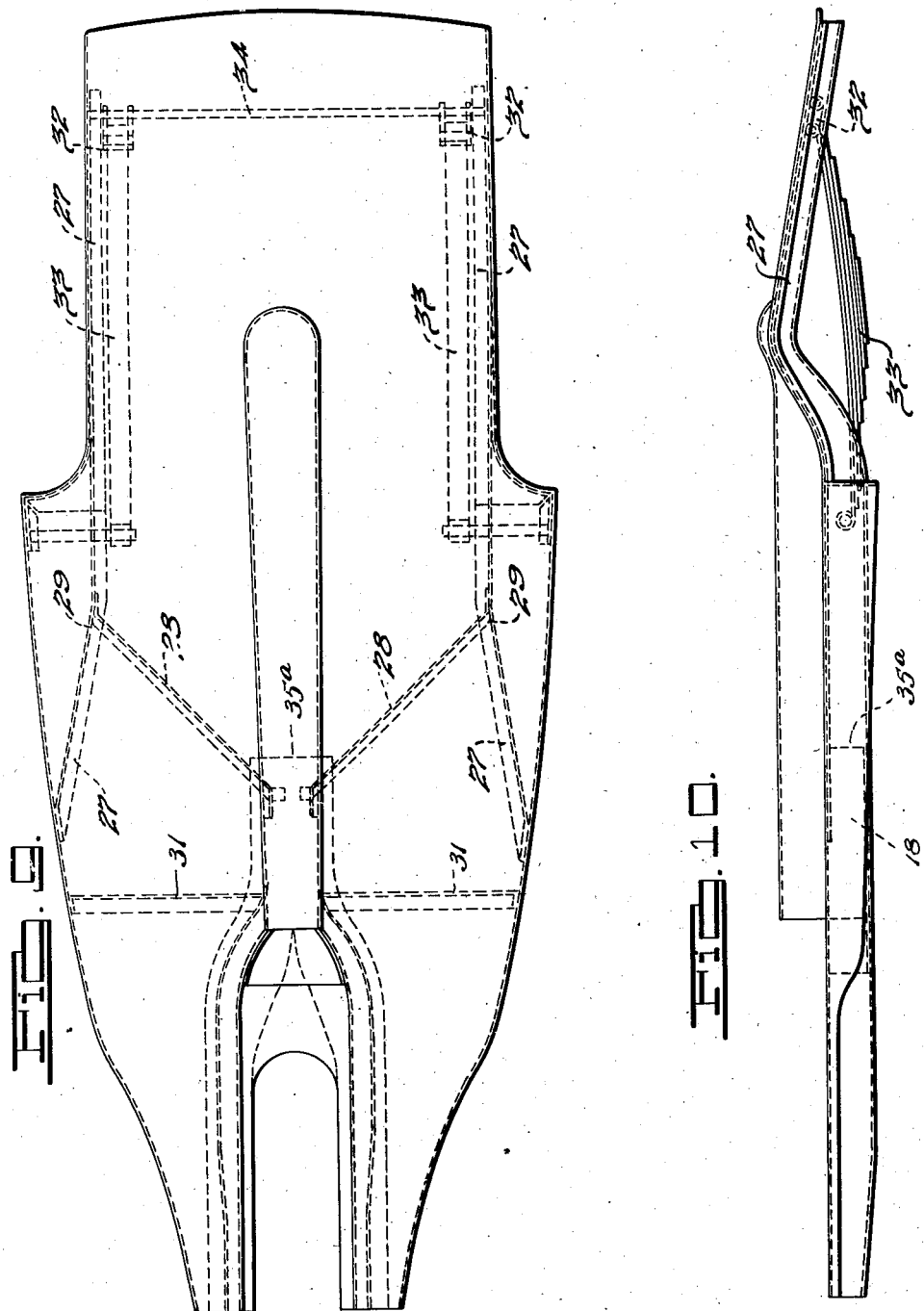
INVENTORS.
John Edward McIntosh,
BY Donald Leonard Ward.
Dike, Calver & Gray
ATTORNEYS.

INVENTORS.
John Edward McIntosh,
Donald Leonard Ward.
BY
Dike, Calvert & Gray
ATTORNEYS.

Patented Aug. 11, 1942

2,292,646

UNITED STATES PATENT OFFICE 2,292,646

MOTOR VEHICLE

John Edward McIntosh and Donald Leonard Ward, Essex, England, assignors to Briggs Motor Bodies Limited, Essex, England, a British company Application May 6, 1939, Serial No. 272,165
In Great Britain May 11, 1938

2 Claims. (Cl. 280—106)

This invention relates to vehicles and particularly to the construction of the frames or underbodies of motor vehicles of the unitary kind wherein the floor and frame of the vehicle are formed integrally thus dispensing with a separate chassis and a separate floor.

An object of the invention is to provide an improved construction of the unitary or integral frame and floor type consisting of as few parts as possible, making for lightness and cheapness of construction.

In previous constructions of the unitary or integral frame and floor type it has ben found necessary to terminate the integral frame and floor at or near the front of the dash panel of the vehicle body, the power unit and front suspension being mounted on a separate extension which is in effect an abbreviated chassis frame and is in turn attached by bolting or welding to the main frame and floor structure.

It has already been proposed to construct a one-piece motor vehicle chassis by pressing a single piece of sheet metal, the chassis thus formed comprising outer longitudinal stiffening members of inverted U-profile, a floor connecting the lower extremities of the inner limbs of said stiffening members and arched longitudinally of the chassis to accommodate the transmission shaft, and an engine housing at the forward end of the chassis having cylindrical or semi-cylindrical bearing mountings therein for the engine.

According to the present invention an integral frame and floor structure is provided which extends forwardly along two opposite sides of the engine crankcase and is reinforced by a tubular or semi-tubular backbone structure which merges into the front portion of the structure at or adjacent to the portions which extend along the aforesaid two sides of the engine crankcase.

The front end of the structure is formed with a space in which the engine is fitted, said space being preferably bounded by two box-like sections formed on the front end into which the aforesaid reinforcement merges.

The reinforcement mentioned above preferably forms part of the propeller shaft tunnel and either the upper or lower portions of the tunnel may be formed integrally with the floor, or the portions may be formed separately and welded or otherwise attached to the floor structure.

Conventional forms of pressed steel or tubular cross member may be applied to the bifurcated front end to carry the various current types of front springing. For semi-elliptic springing the rear shackles of the front springs may be carried on transverse reinforcements arranged behind the front of the propeller shaft tunnel where it merges into the front portion of the structure. Such reinforcements also serve as an additional brace for the floor at this section.

Further additional bracing may be provided beneath the main section of the floor and this bracing may also be used for carrying rear suspension shock absorbers or for the attachment of the various types of springing in use.

Other objects and advantages of this invention will appear in the following description and appended claims, reference being had to the accompanying drawings forming a part of this specification wherein like reference characters designate corresponding parts in the several views.

In said drawings:

Fig. 1 is a top plan view of an integral floor and frame structure according to one form of the invention.

Fig. 2 is a side elevation of the structure shown in Fig. 1.

Fig. 3 is a section on line 3—3, Fig. 1.

Fig. 4 is a section on line 4—4, Fig. 1.

Fig. 5 is a section on line 5—5, Fig. 1.

Fig. 6 shows the section on each of the lines 6—6, Fig. 1.

Fig. 7 is a section on the line 7—7, Fig. 1.

Fig. 8 is a section on the line 8—8, Fig. 1.

Fig. 9 is a top plan view similar to Fig. 1 but showing the mounting of a semi-elliptical spring.

Fig. 10 is a side elevation of the structure shown in Fig. 9.

Fig. 11 is a plan view of the rear portion of a structure similar to Fig. 1 but showing an arrangement for accommodating transverse rear springing.

Fig. 12 is a side elevation of the structure of Fig. 11.

Fig. 13 is an elevation of a part of the front of the structure of Fig. 1 showing the application of independent front suspension using a transverse leaf spring, drawn to a larger scale.

Fig. 14 is a section on line 14—14 of Fig. 13; and

Fig. 15 is a slightly enlarged section on line 15—15 of Fig. 1, looking in the direction of the arrows.

Figure 16:
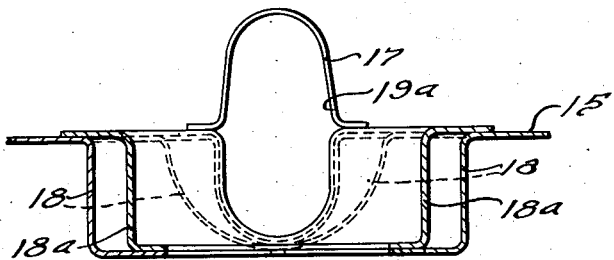
Fig. 16 is a view similar to Fig. 15 but showing a somewhat modified form of the present invention.

Referring now to Figs. 1 to 8 inclusive, the entire combined floor and frame 15, as shown, is formed from a single sheet of metal except for such apertures and covers as are required for accessibility to the engine, transmission or suspension components. The structure may be stiffened by a series of depressions 15a in known manner. An opening 16 is made in the floor to accommodate the engine while, as seen in Fig. 1, the outer edges of the floor taper sharply towards the front to provide the necessary clearance for the wheels at full lock. The propeller shaft tunnel, which acts as part of the reinforcement, as shown, comprises an upper portion 17 and a lower portion 18 of generally semi-circular or semi-oval section (Figs. 4 and 5) the two portions being attached to one another to complete the tube. As shown, the upper portion 17 of the tube is formed in the main floor stamping 15, the front end terminating at a convenient point 19 having an opening 19a, see Fig. 15, behind the position or location of the usual gear box (not shown) or behind the front universal joint (not shown) if accessibility is desired to this component. The lower portion 18 of the tube may be formed from one or more separate pieces of metal, the rear end terminating at any suitable point, for example in front of the differential housing (not shown) or in front of the rear universal joint (not shown) where such is used, or at 35a as seen in Figs. 1 and 2.

At the front end 19 of the propeller shaft tunnel the tunnel material is cut transversely, and forwardly thereof is bent downwardly together with the adjacent floor portions, the latter merging into two vertical webs 22 which extend to the extreme front of the frame and pass along two opposite sides of the engine crank case. The portion of the material between the webs 22 is bent at 22a into a flat horizontal plate 22c which is cut away forward of the curved line 22b while the distance between the vertical webs 22 increases from approximately the width of the tunnel at its front end, the arrangement being such as will provide a sufficient opening for accommodating the engine unit so that a bifurcated front portion is formed as shown. From each vertical web a small inwardly turned flange 23 may be formed along the bottom to provide a convenient method of attaching other portions of the structure. At a point 24 to the rear of the engine opening in the floor 15 the lower portion 18 of the propeller shaft tunnel is bifurcated at 24a and is increased in width, at the same time merging into walls 25 and a bottom 25b, the walls 25 being parallel or nearly parallel to and outside the vertical webs 22 of the floor at the engine opening. Thus the section of the tunnel 18 gradually changes from the semi-circular form to a divided rectangular channel 25a (Fig. 3) the depth of which is equal to that of the vertical webs 22 of the floor above. The flanges 23 on the bottom edges of the webs 22 are secured as by welding or riveting to the bottom flanges 25b of the channel 25a as shown.

The opening between the walls 25 forward of the curve 25b is substantially the same width as that in the floor 15 and is made in the bottom of the channel to accommodate the engine.

The above described construction produces a floor and frame assembly reinforced by a tubular backbone structure which merges into two parallel box sections at the front end, the engine being carried in the space between them. If desired, a reinforcing channel section 120 (see Figs. 2 and 15) of similar contour to the portions above described about the point 19 may be added and attached at the one end to the rear of the vertical webs on the floor and extending and changing in section so as to permit attaching it at its rear end to the inside of the lower portion 18 of the propeller shaft tunnel.

The outer edges of the floor 15, which is substantially parallel to the inside of the door bottoms, may be pressed downwards to produce vertical webs 26 (Fig. 3) and these webs, in conjunction with the outer panels of the vehicle body, complete a box section side sill extending from the scuttle side or front wing to the rear wheel housing of the vehicle body. The parts of the webs 26 near the front of the structure provide a convenient attaching flange for the front wing valance which, when securely welded or riveted in position, provides additional support for the engine mounting projections.

Further, the floor 15 is here shown as reinforced to carry the quarter elliptic type of rear springing. On each side of the center line of the floor two members 27, 28 which may be of channel or other suitable cross section, are attached at their front ends to the outer flange 26 of the floor and to the lower half 18 of the propeller shaft tunnel, respectively. The upper flange or flanges of each member is welded to the underside of the floor.

The outer members 27 are bent inwards as shown so that the rear end is in line with the inside of the wheel housing in plan view, being set up to follow the rise of the floor over the rear axle.

The inner members 28 are bent outwards to meet the outer members 27 at a point 29 in front of the wheel housing. When the members 27, 28 are of channel section they are placed with the open sides of the channels facing each other so that at the point 29 the top and bottom flanges of the one member overlap the corresponding flanges of the other to form a box section. The fixed end of the quarter elliptic spring may be anchored and clamped in the box section so formed.

The members 28 may be extended to the rear of the box section portion and reinforced by plates 30 to carry the rear wheel shock absorbers.

For semi-elliptic springing (Figs. 9 and 10) the rear shackles of the front springs (not shown) are carried on reinforcements 31 located behind the frontal enlargement of the propeller shaft tunnel as shown.

Figs. 9 and 10 show the modifications necessary in the floor 15 for semi-elliptic springing of the rear wheels. In this case reinforcing members 27, 28 are again used and the outer members 27 are bent inwards so that at the points 29 ahead of the wheel housing they are substantially in line with the inside of the wheel housing in plan view and are then extended and set up to follow the rise of the floor 15 over the rear axle terminating suitably at the rear of the body to carry the rear shackles 32 of the springs 33. In the present form, as stated above, a transverse reinforcement 31 is provided. Moreover, the portion 18 of the propeller tunnel terminates at its rear or inner end at the point 35a.

A further reinforcement or cross member 34 of tubular or other section may be added to give lateral stability to the rearmost portion of the side members of the floor.

Figs. 11 and 12 show the modifications necessary in the floor 15 for transverse rear springing. Reinforcing members 27, 28 arranged as in Figs. 9 and 10 are used and the members 27 follow the rise of the floor over the rear axle as before.

A transverse member 35 of channel or other section is added at or near the plan view center line of the rear axle and the transverse spring is then attached to the member 35 in the usual manner. The outer reinforcing members 27 may in this case be terminated at or slightly behind the member 35.

The construction shown in Figs. 11 and 12 may also be used to accommodate the helical type of rear springing, the member 35 being suitably formed to provide upper bearing surfaces for the ends of the spring coils (not shown). In cases where reinforcements such as the members 27, 28 are used, the rear end of the lower portion 18 of the propeller shaft tunnel may terminate at 35a or slightly behind the points where the members are attached, see Figs. 9 and 10.

Figs. 13 and 14 show the application to the floor of independent front wheel suspension using a transverse leaf spring. In this case a transverse member 36 of channel section houses the spring 37 and is attached to the bottom flanges of the bifurcated front end of the floor on each side as shown. The member 36 is secured to a second transverse reinforcing member 38 also of channel section which is mounted on the upper surface of the bifurcated ends of the frame at a suitable point on each side thereof and carries plates 39 for shackle arm connections as shown.

In a modified construction the upper part 17 of the propeller shaft tunnel may be made from a stamping separate from the main floor 15 and then welded to or otherwise attached to the floor, which may be formed of one or more plates.

Further, the lower portion 18 of the tunnel may be formed integrally with the floor 15 and in this case at the bifurcated front end of the floor the portion 18 forms the outer member of the box section engine supports, see Fig. 16, the inner member being shown at 18a.

Figure 17:
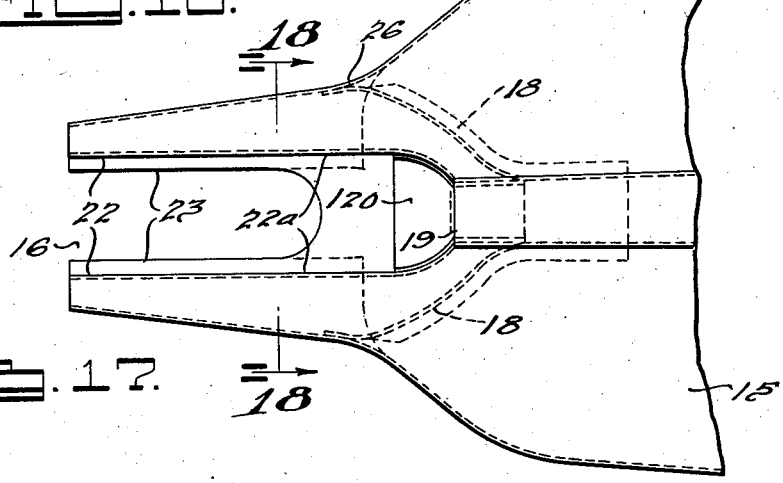
Fig. 17 is a fragmentary view, generally similar to Fig. 1, showing a further modified embodiment of the present invention.
Figure 18:
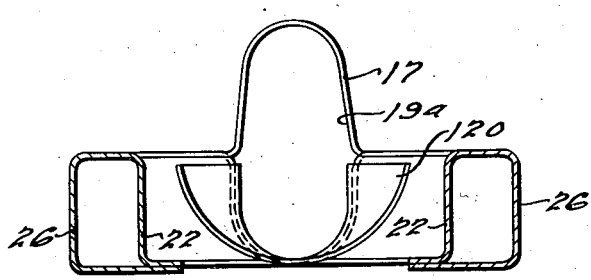
Fig. 18 is a sectional view taken substantially along the line 18—18 of Fig. 17, looking in the direction of the arrows.
Figure 19:
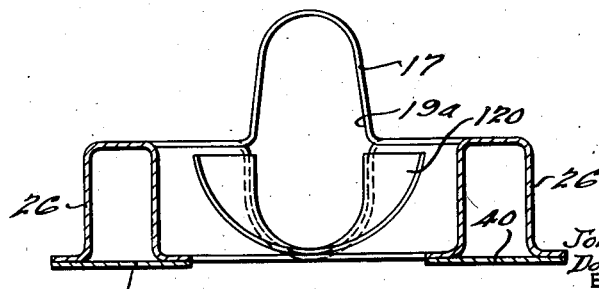
Fig. 19 is a view similar to Fig. 18 showing a further modified form embodying the present invention.

In a further modification, shown in Figs. 17 and 18 the vertical webs 26 forming the outer edge of the floor 15 are used to replace the bifurcated front extensions of the lower portion of the shaft tunnel. In this case the lower portion 18 of the tunnel is abbreviated at the front end and may be splayed outwardly to permit of its attachment to the outer vertical webs of the floor. The outer webs 26 of the floor may be formed with an inwardly turned bottom flange at the bifurcated front end of the floor to form a box section; or, if desired, a tie plate or plates 40 may be secured across the bottom from the inner to the outer webs to complete a box section in each case, see Fig. 19. In this latter case the lower portion 18 of the tunnel may be attached to the rear of the tie plates.

We claim:

1. A unitary frame and floor structure for a motor vehicle in which the intermediate section of the floor is wider in a transverse direction than the sections located at the front and rear thereof and in which the front section converges toward its forward end, said front floor section being bifurcated and providing laterally spaced web-like extensions having box-like reinforcing portions at their inner opposed edges extending longitudinally thereof, said box-like portions being located below the plane of the floor and defining the sides of a U-shaped longitudinally extending opening adapted to receive the crankcase of an engine, means extending transversely of said structure at substantially the juncture of the front and intermediate floor sections for reinforcing the structure, and a tunnel of substantially tubular construction disposed longitudinally of said structure and having one end thereof merging with the frame and floor structure at a point adjacent the inner ends of said spaced web-like extensions, said tunnel comprising upper and lower sections, one thereof being formed integrally with the floor structure.

2. A unitary frame and floor structure for a motor vehicle in which the intermediate section of the floor is wider in a transverse direction than the sections located at the front and rear thereof and in which the front section converges toward its forward end, said front floor section being bifurcated and providing laterally spaced web-like extensions having box-like reinforcing portions at their inner opposed edges extending longitudinally thereof, said box-like portions being located below the plane of the floor and defining the sides of a U-shaped longitudinally extending opening adapted to receive the crankcase of an engine, means extending transversely of said structure at substantially the juncture of the front and intermediate floor sections for reinforcing the structure, and a tunnel of substantially tubular construction disposed longitudinally of said structure and comprising upper and lower portions of semi-circular form extending throughout the length of the intermediate floor section, said upper tunnel portion terminating at a point substantially above the inner ends of said box-like reinforcing portions of the web-like extensions and said lower tunnel portion extending beyond the inner ends of the box-like portions and being flared outwardly in a direction transversely of the structure beyond the terminus of said upper tunnel portion.

JOHN EDWARD McINTOSH.
DONALD LEONARD WARD.